(12) United States Patent
Ohta et al.

(10) Patent No.: US 8,528,904 B2
(45) Date of Patent: Sep. 10, 2013

(54) CARD ISSUING DEVICE

(75) Inventors: Keiji Ohta, Nagano (JP); Toshio Tatai, Nagano (JP)

(73) Assignee: Nidec Sankyo Corporation (JP)

( * ) Notice: Subject to any disclaimer, the term of this patent is extended or adjusted under 35 U.S.C. 154(b) by 470 days.

(21) Appl. No.: 12/920,390

(22) PCT Filed: Jan. 29, 2009

(86) PCT No.: PCT/JP2009/000336
§ 371 (c)(1),
(2), (4) Date: Nov. 29, 2010

(87) PCT Pub. No.: WO2010/061488
PCT Pub. Date: Jun. 3, 2010

(65) Prior Publication Data
US 2011/0062662 A1 Mar. 17, 2011

(30) Foreign Application Priority Data
Nov. 27, 2008 (JP) ................................. 2008-302647

(51) Int. Cl.
*A63F 1/12* (2006.01)
(52) U.S. Cl.
USPC ............................. 273/149 R; 463/25; 463/22
(58) Field of Classification Search
USPC ........................ 273/149 R, 149 P; 463/25, 22
See application file for complete search history.

(56) References Cited

U.S. PATENT DOCUMENTS

| | | | | |
|---|---|---|---|---|
| 4,912,310 A | * | 3/1990 | Uemura et al. | 235/380 |
| 5,199,710 A | * | 4/1993 | Lamle | 463/22 |
| 5,779,546 A | * | 7/1998 | Meissner et al. | 463/25 |
| 6,093,103 A | * | 7/2000 | McCrea, Jr. | 463/27 |
| 8,197,334 B2 | * | 6/2012 | Chudd et al. | 463/25 |
| 2002/0068635 A1 | * | 6/2002 | Hill | 463/47 |
| 2006/0073883 A1 | * | 4/2006 | Franks | 463/25 |

FOREIGN PATENT DOCUMENTS

| | | |
|---|---|---|
| JP | 5-25549 U | 4/1993 |
| JP | 2008-165483 A | 7/2008 |
| JP | 2010-128781 A | 6/2010 |
| WO | 2010/061488 A1 | 6/2010 |

OTHER PUBLICATIONS

International Search Report for International Application No. PCT/JP2009/000336 mailed Sep. 1, 2009 with English translation.

* cited by examiner

*Primary Examiner* — Benjamin Layno
(74) *Attorney, Agent, or Firm* — Cantor Colburn LLP

(57) ABSTRACT

A card issuing machine may include a card storage part, a card reader part, a housing accommodating the card storage part and the card reader part, and a lock mechanism for locking the housing in a closed state. The housing may include a first case body provided as at least a front face of the card issuing machine, a second case body structured to cover an upper side of the card storage part, and a third case body structured to cover an upper side of the card reader part. The third casing may be engaged with the first casing so that the third casing does not move away from the first casing at the upper, lower, left, right, and front sides, and may also be engaged with the second casing so that the third casing does not move away from the first casing at the rear side.

18 Claims, 11 Drawing Sheets

CARD ISSUING DEVICE

CROSS REFERENCE TO RELATED APPLICATIONS

This is a U.S. national stage of international application No. PCT/JP2009/000336, filed on Jan. 29, 2009. Priority under 35 U.S.C. §119(a) and 35 U.S.C. §365(b) is claimed from Japanese Application No. 2008-302647, filed Nov. 27, 2008, the disclosure of which is also incorporated herein by reference.

FIELD OF THE INVENTION

The present invention relates to a card issuing machine for issuing a card which is stored in its inside.

BACKGROUND

Conventionally, a card issuing machine for issuing a card accommodated in its inside has been known (see, for example, Patent Reference 1). The card issuing machine which is described in Patent Reference 1 includes a card storage part in which cards before issued are stacked and stored, and a card reader part where information recorded in a card is reproduced or information is recorded in a card.

[Patent Reference 1] Japanese Patent Laid-Open No. 2008-165483

The card issuing machine which is disclosed in Patent Reference 1 is commonly mounted on a host device which is provided with a display, a receipt printer and the like and is accommodated within a housing of the host device. Therefore, a housing for a card issuing machine which is provided with a card storage part and a card reader part has not been proposed yet.

In view of the problem described above, at least an embodiment of the present invention provides a card issuing machine which is provided with a housing suitable for a card issuing machine having a card storage part and a card reader part.

SUMMARY

In order to solve the above problem, at least an embodiment of the present invention provides a card issuing machine for issuing a card which is stored in an inside of the card issuing machine, including a card storage part in which cards before being issued are stacked and stored, a card reader part for performing reproduction of information recorded in a card and/or recording of information to a card, a housing in which the card storage part and the card reader part are accommodated, and a lock mechanism for locking the housing so that the housing in a closed state does not open. The card storage part and the card reader part are disposed so that a card carried out from the card storage part is passed the card reader part toward a card ejection port from which the card is ejected. Further, the housing includes a first case body which structures at least a front face of the card issuing machine where the card ejection port is formed and a part of a side face of the card issuing machine, a second case body for covering an upper side of the card storage part, and a third case body for covering an upper side of the card reader part. The third case body is engaged with the first case body so that the third case body is not detached from the first case body toward both side face sides of the card issuing machine, toward a front face side and toward both upper and lower sides of the card issuing machine, and the third case body is engaged with the second case body so that the third case body is not detached from the first case body toward a rear face side of the card issuing machine, and the lock mechanism locks the second case body so that the second case body does not open with respect to the first case body.

In at least an embodiment of the card issuing machine, the third case body is engaged with the first case body so that the third case body is not detached from the first case body toward both side face sides of the card issuing machine, toward a front face side and toward an upper and lower sides of the card issuing machine, and the third case body is engaged with the second case body so that the third case body is not detached from first case body toward a rear face side of the card issuing machine. Further, the lock mechanism locks the second case body so that the second case body does not open with respect to the first case body.

Therefore, the third case body is unable to be detached from the first case body unless the lock mechanism is released, the second case body is opened and the third case body is moved to the rear face side of the card issuing machine. In other words, even when a separate lock mechanism is not provided for locking the third case body so that the third case body is not detached from the first case body, the third case body is not detached from the first case body unless the second case body is not opened. Therefore, a separate lock mechanism for locking the third case body is not required and thus a structure of the card issuing machine can be simplified.

Further, the card storage part is required to replenish with cards and the like and thus open-and-close frequency of the second case body is higher. However, the third case body is not required to be detached from the first case body as long as malfunction such as card jamming is not occurred in the card reader part. When the lock mechanism is released, only the second case body whose open-and-close frequency is higher can be opened and closed in the state where the third case body is attached to the first case body. Therefore, open-and-close operation of the housing is easy.

In at least an embodiment of the present invention, the first case body is provided with an upper face cover part which covers a part on an upper side of the card reader part on the front face side of the card issuing machine, that the first case body is formed with a first abutting face which is capable of abutting with the third case body from an inner side in a right and left direction that is perpendicular to a front and rear direction and an upper and lower direction of the card issuing machine, that the upper face cover part is formed with a second abutting face, which is capable of abutting with the third case body from a lower side, and a third abutting face which is capable of abutting with the third case body from the front face side of the card issuing machine, and that the third case body is formed with an engaging projection for engaging with an under face of the upper face cover part. According to this structure, the first case body and the third case body are engaged with each other so that the third case body is not detached from the first case body toward both side face sides of the card issuing machine, toward the front face side and the upper and lower sides of the card issuing machine by the first abutting face, the second abutting face and the third abutting face, which are formed on the first case body, and the engaging projection which is formed on the third case body.

In at least an embodiment of the present invention, the third case body is formed with a fourth abutting face, which is capable of abutting with the second case body from a lower side, and a fifth abutting face which is capable of abutting with the second case body from the front face side of the card issuing machine. According to this structure, the second case body and the third case body are engaged so that the third case body is not detached from the first case body toward the rear face side and the upper side of the card issuing machine by the fourth abutting face and the fifth abutting face which are formed on the third case body.

In at least an embodiment of the present invention, one of the first case body and the third case body is formed with a slide groove for sliding the third case body toward the front face side of the card issuing machine, and that the other of the first case body and the third case body is formed with a slide protruded part which is engaged with the slide groove. According to this structure, positioning of the third case body with respect to the first case body is easy.

In at least an embodiment of the present invention, the card issuing machine is provided with a hinge for opening and closing of the second case body with respect to the first case body, and that the hinge is disposed on the rear face side of the card issuing machine. According to this structure, opening/closing operation of the second case body to the first case body is easily performed and workability is improved. Further, handling of the second case body is easy in comparison with a case that the second case body is detached from the card issuing machine whenever the second case body is opened and closed. In addition, workings in the card storage part such as replenishment of cards or maintenance are capable of performing from the front side of the card issuing machine.

In at least an embodiment of the present invention, the card issuing machine includes a card collection storage for collecting a card which is provided under the card storage part, that a side face of the card collection storage is formed with a take-out opening for the card that is collected, and that the second case body is provided with a side face cover part which structures a part of the side face of the card issuing machine and covers the take-out opening. According to this structure, even when an open-and-close part for the card collection storage is not provided separately in the housing, cards collected in the card collection storage are taken out by making the second case body open. Therefore, the housing is not required to provide with an open-and-close part for the card collection storage and thus the structure of the housing can be simplified.

In at least an embodiment of the present invention, the card issuing machine includes a card collection storage for collecting the card, which is provided under the card storage part, and the card issuing machine includes a power supply and/or a control board which are disposed under the card reader part. According to this structure, a power supply and a control board can be disposed by utilizing a space which is formed under the card reader part (in other words, formed on a lateral side of the card collection storage). Therefore, the size of the card issuing machine can be reduced.

As described above, in at least an embodiment of the present invention, a separate lock mechanism for locking the third case body is not required and thus the structure of the card issuing machine can be simplified. Further, only the second case body whose open-and-close frequency is higher can be opened and closed in the state where the third case body is attached to first case body and thus open-and-close operation of the housing is easy.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 9(A) is its plan view, FIG. 9(B) is its side view, FIG. 9(C) is a side view showing a slide protruded part which is formed on the third case body, and FIG. 9(D) is a view showing the slide protruded part which is viewed in the "G-G" direction in FIG. 9(C).

DETAILED DESCRIPTION OF PREFERRED EMBODIMENTS

At least an embodiment of the present invention will be described below with reference to the accompanying drawings.

(Schematic Structure of Card Issuing Machine)

Figure 1:
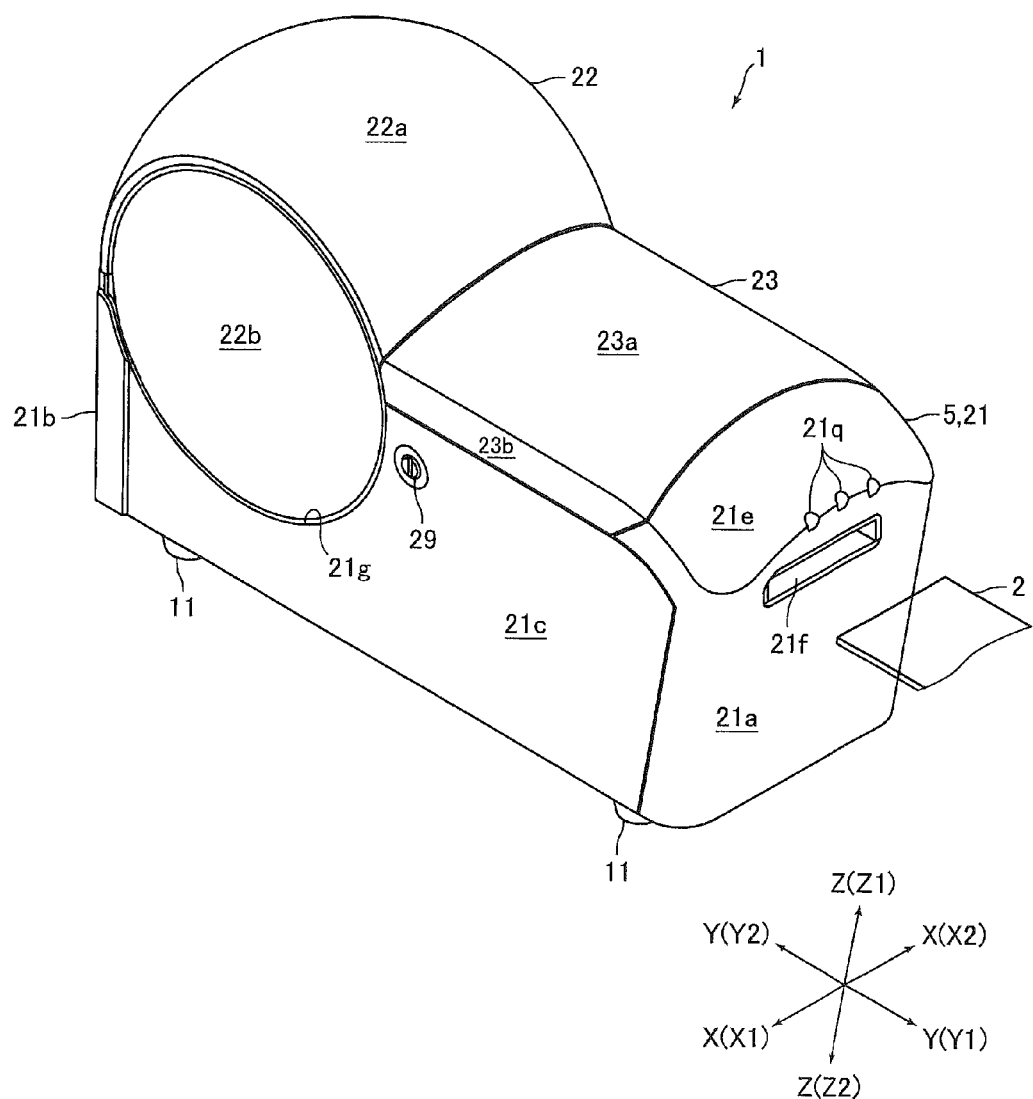
FIG. 1 is a perspective view showing a card issuing machine in accordance with an embodiment of the present invention.
Figure 2:
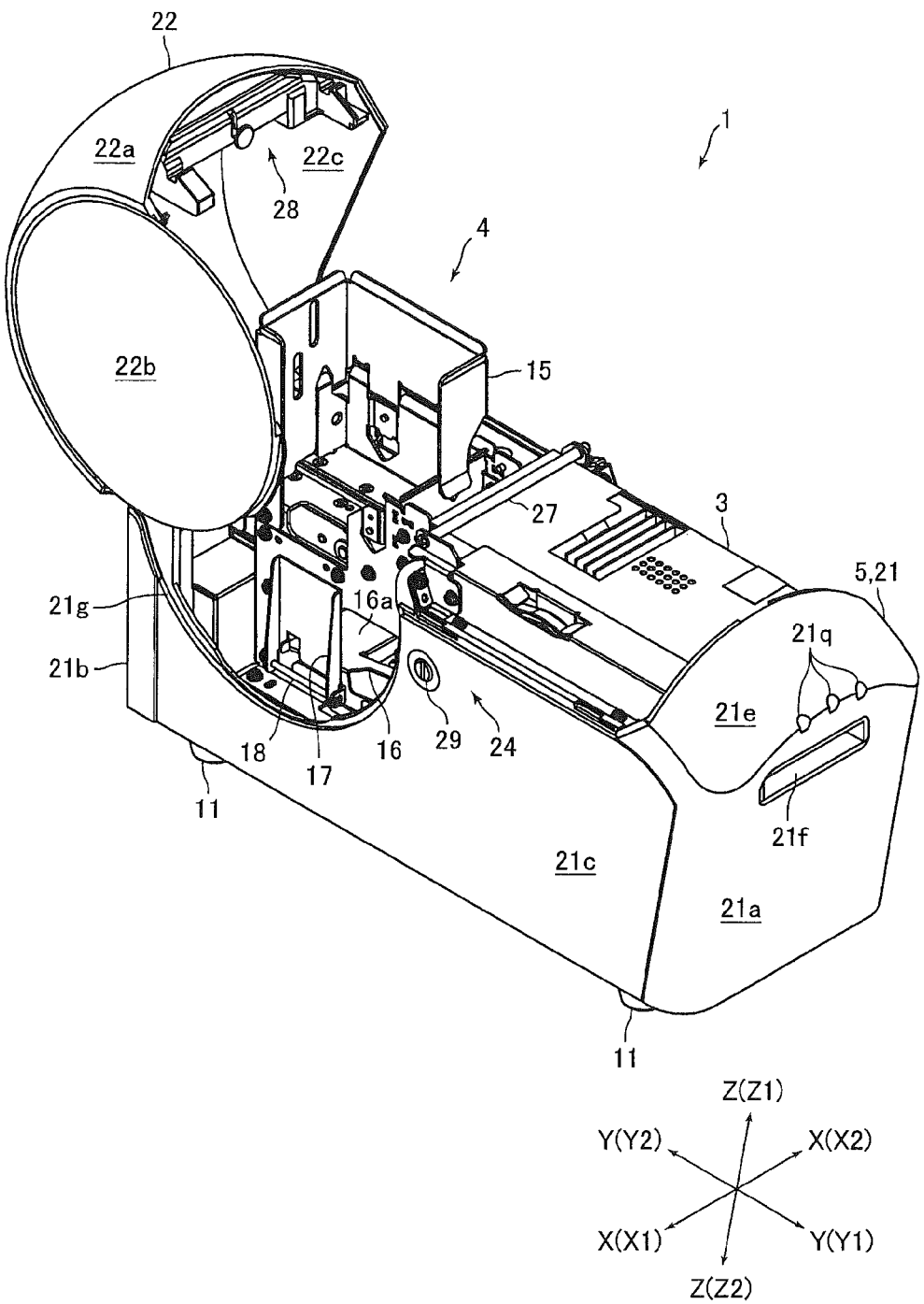
FIG. 2 is a perspective view showing a state that a part of a housing is detached from the card issuing machine shown in FIG. 1.
Figure 3:
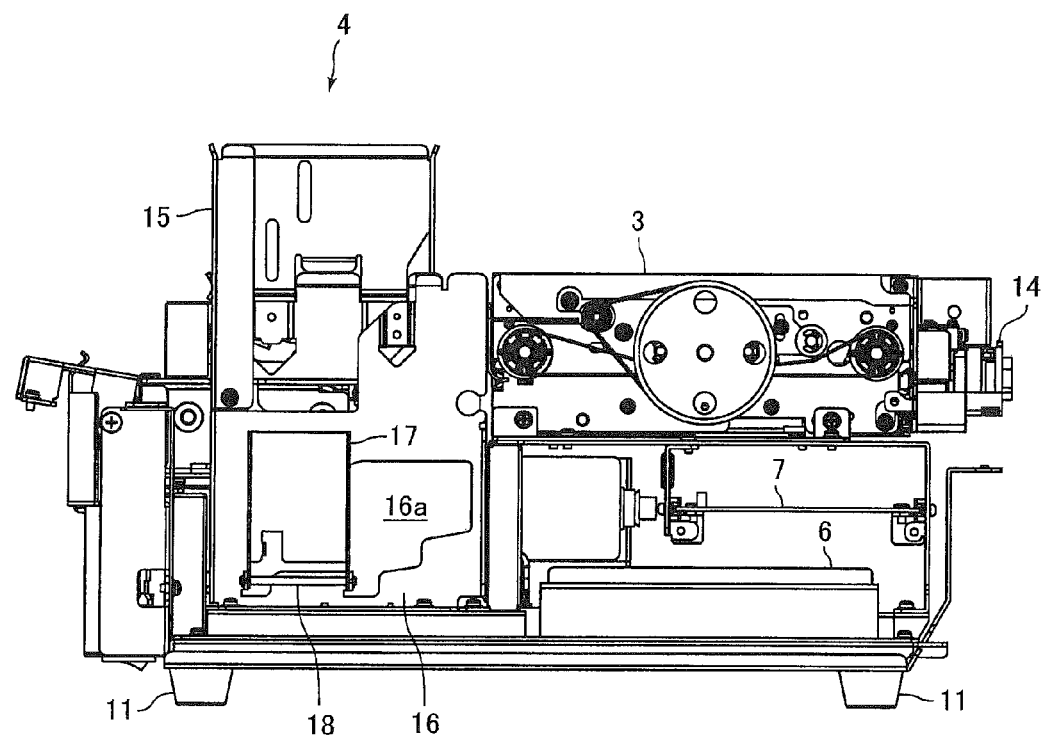
FIG. 3 is a side view showing an inside structure of the card issuing machine in FIG. 1.
Figure 3:
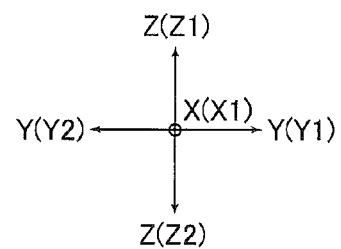
Figure 4:
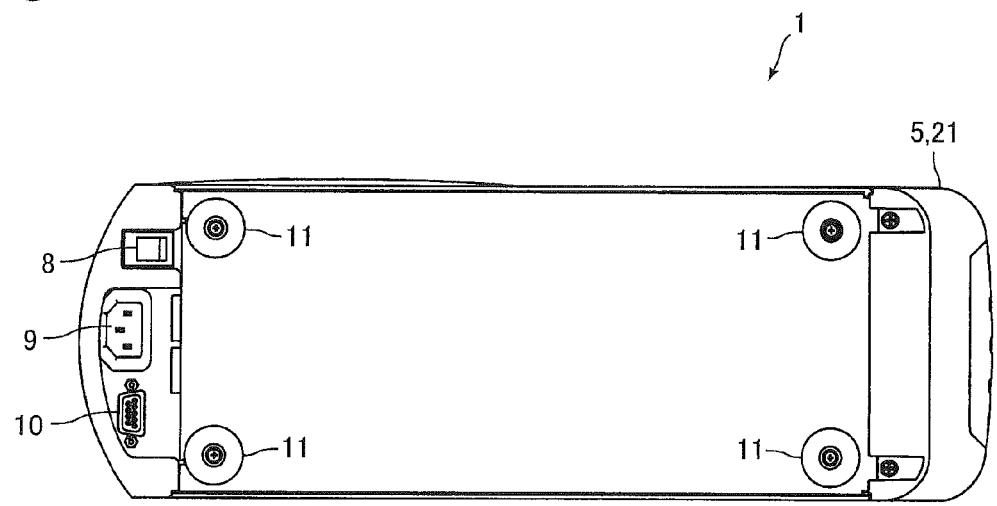
FIG. 4 is a bottom view showing the card issuing machine in FIG. 1.
Figure 4:
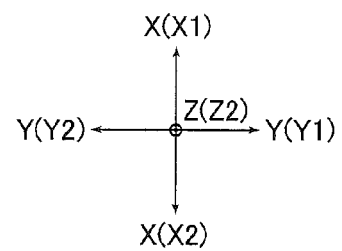

FIG. 1 is a perspective view showing a card issuing machine 1 in accordance with an embodiment of the present invention. FIG. 2 is a perspective view showing a state that a part of a housing 5 is detached from the card issuing machine 1 shown in FIG. 1. FIG. 3 is a side view showing an inside structure of the card issuing machine 1 in FIG. 1. FIG. 4 is a bottom view showing the card issuing machine 1 in FIG. 1.

In the following descriptions, three directions perpendicular to each other are respectively set in an "X" direction, a "Y" direction and a "Z" direction. Further, in FIG. 1 and the like, an "X1" direction side is referred to as a "right" side, an "X2" direction side is referred to as a "left" side, a "Y1" direction side as a "front" side, a "Y2" direction side as a "back" side, a "Z1" direction side as an "upper" side, and a "Z2" direction side as a "lower" side.

The card issuing machine 1 in this embodiment is provided with a function for issuing a card 2 which is stored in its inside. The card issuing machine 1 is installed and used, for example, in a front desk of a hotel, a register counter in a convenience store and the like. Further, the card issuing machine 1 in this embodiment is also provided with a function for collecting a card 2 such as an unnecessary card, a used card or an error card (hereinafter, referred to as an "unnecessary card 2").

The card issuing machine 1 includes, as shown in FIGS. 1 through 3, a card reader part 3 where reproduction of information recorded in a card 2 and/or recording of information into a card 2 are performed, a card issuing and collecting part 4 where a stored card 2 is issued and an unnecessary card 2 is collected, and a housing 5 into which the card reader part 3 and the card issuing and collecting part 4 are accommodated.

Further, the card issuing machine 1 is provided with a power supply 6 for supplying electric power to the card reader part 3, the card issuing and collecting part 4 and the like, and a control board 7 for controlling the card reader part 3, the card issuing and collecting part and the like. A bottom face on a rear end side of the card issuing machine 1 is, as shown in FIG. 4, disposed with a power switch 8, a terminal 9 for power supply, and a terminal 10 for computer (personal computer). Further, a rubber foot 11 is attached at four corners on the bottom face of the card issuing machine 1.

A card 2 is, for example, used as a room key in a hotel or a prepaid card which is utilized in a convenience store or the like. The card 2 is, for example, a rectangular card made of vinyl chloride whose thickness is about 0.7-0.8 mm. A surface of the card 2 is, for example, formed with a magnetic stripe where magnetic information is recorded. Further, for example, a surface of the card 2 is fixed with an IC chip. In accordance with an embodiment of the present invention, a card 2 may be provided with an antenna for communication. Further, a print part to which printing is performed by a thermal method may be formed on a surface of the card 2. Further, a card 2 may be a PET (polyethylene terephthalate) card whose thickness is about 0.18-0.36 mm or may be a paper card having a specified thickness.

The card reader part 3 is, as shown in FIG. 3, provided with an insertion and ejection part 14 for inserting and ejecting a card 2. Further, the card reader part 3 is provided with a card feeding mechanism for carrying a card 2 in the card reader part 3, and a recording and reproducing means for performing recording and reproduction of information such as a magnetic head, an IC contact block and/or a communication antenna.

The card issuing and collecting part 4 is provided with a card storage part 15 in which a plurality of cards 2 before being issued is stacked and stored, and a card collection storage 16 in which an unnecessary card 2 is collected. As shown in FIG. 3, the card storage part 15 and the card collection storage 16 are disposed so as to overlap with each other in the upper and lower direction. Further, the card issuing and collecting part 4 is provided between the card storage part 15 and the card collection storage 16 with a card sending-out mechanism (not shown) for sending out a card 2, which is the lowest of a plurality of cards 2 stored in the card storage part 15, toward the card reader part 3.

The card storage part 15 is formed in a rectangular parallelepiped box-like shape whose upper face is opened. Further, as shown in FIG. 2, a front side of a right side face of the card storage part 15 and a right side of its front side face are cut off. The card sending-out mechanism is provided with a sending-out pawl which is capable of engaging with a card 2 stored in the card storage part 15 to send out cards 2 one by one from the card storage part 15, a chain to which the sending-out pawl is fixed, a drive mechanism for the chain and the like.

The card collection storage 16 is formed in a rectangular parallelepiped box-like shape whose upper face is opened. A right side face of the card collection storage 16 is formed with a take-out opening 16a for taking out cards 2 which are collected in the card collection storage 16. A rear end side of the take-out opening 16a is covered with a cover 17. The cover 17 is turnably supported by a shaft 18 disposed on a lower end side and is urged toward the right side face of the card collection storage 16 by a spring (not shown). Further, an upper end side with respect to the card collection storage 16 is disposed with a guide member (not shown) for guiding an unnecessary card 2 to the card collection storage 16.

As shown in FIG. 3, in this embodiment, the card reader part 3 and the card issuing and collecting part 4 are disposed in this order from the front end side of the card issuing machine 1 so as to contact with each other. Specifically, the card reader part 3 is disposed on a front side of the card storage part 15. In other words, the card reader part 3 is disposed so that a card 2 carried from the card storage part 15 is passed toward the card ejection port 21f from which the card 2 is ejected. Further, the card reader part 3 is disposed upper than the card collection storage 16 in the upper and lower direction. In addition, an upper end side of the card storage part 15 is protruded upper than an upper face of the card reader part 3.

A power supply 6 and a control board 7 are disposed under the card reader part 3 and on the front side with respect to the card collection storage 16. Specifically, the power supply 6 is disposed on a bottom face side of the card issuing machine 1 and the control board 7 is disposed on an upper side with respect to the power supply 6.

In this embodiment, when a card 2 is to be issued, first, the card sending-out mechanism sends out a card 2 stored in the card storage part 15 toward the card reader part 3. In the card reader part 3 where the card 2 having been sent out from the card storage part 15 is received, for example, a predetermined information is recorded in the card 2. Further, the card 2 in which information has been recorded is ejected (issued) from the card issuing machine 1.

Further, for example, a card 2 is inserted into the card issuing machine 1 and reproduction of information is performed by the card reader part 3 and, as a result, when the card 2 is judged to be collected, the card 2 is ejected toward the card issuing and collecting part 4 from the card reader part 3. The card 2 ejected from the card reader part 3 is guided to the card collection storage 16 by the guide member and collected. Since the card collection storage 16 is disposed lower than the card reader part 3, the card 2 ejected from the card reader part 3 is dropped into the card collection storage 16 by its own weight.

(Structure of Housing)

Figure 5:
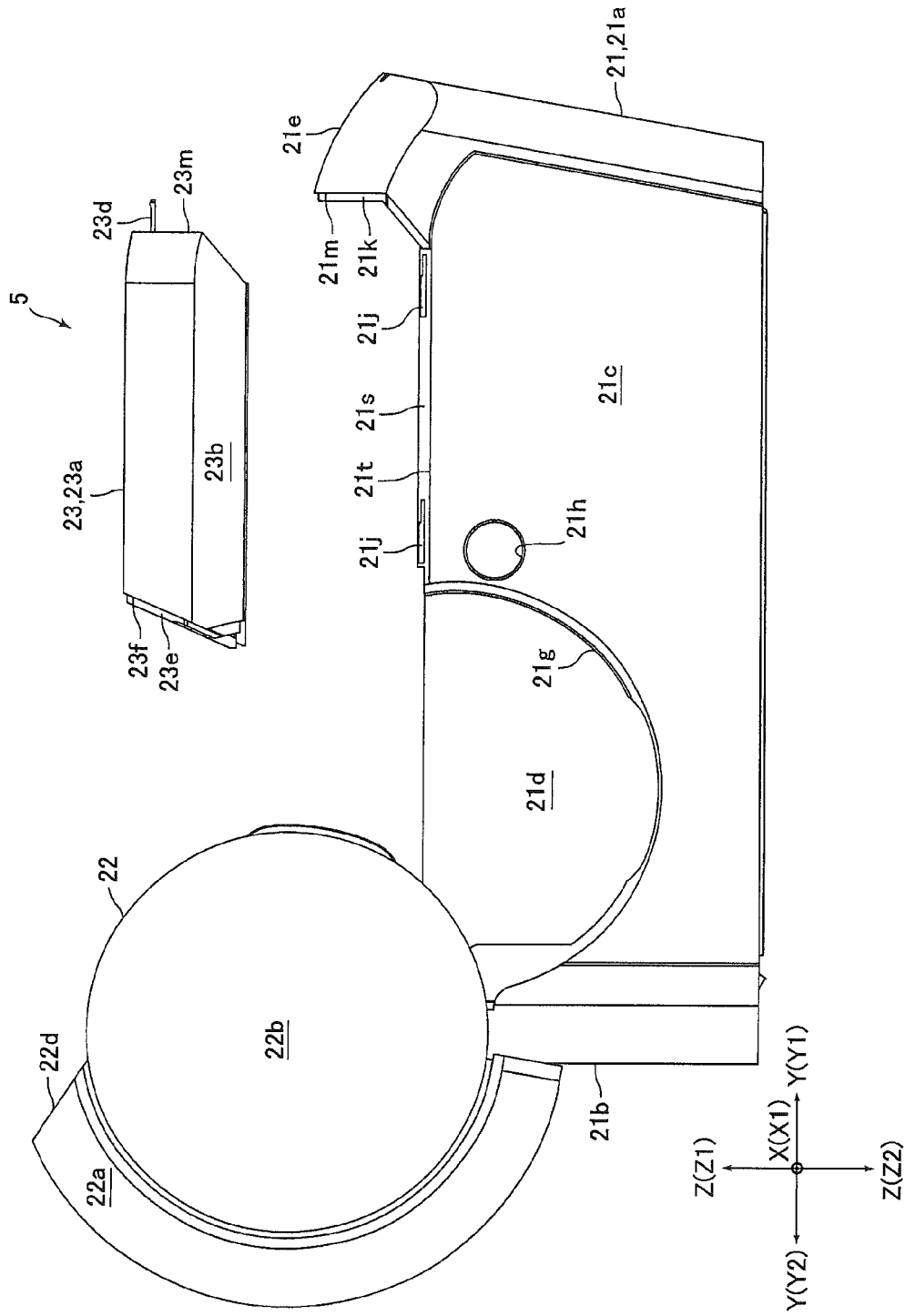
FIG. 5 is a side view showing a state where a housing shown in FIG. 1 is opened.
Figure 6:
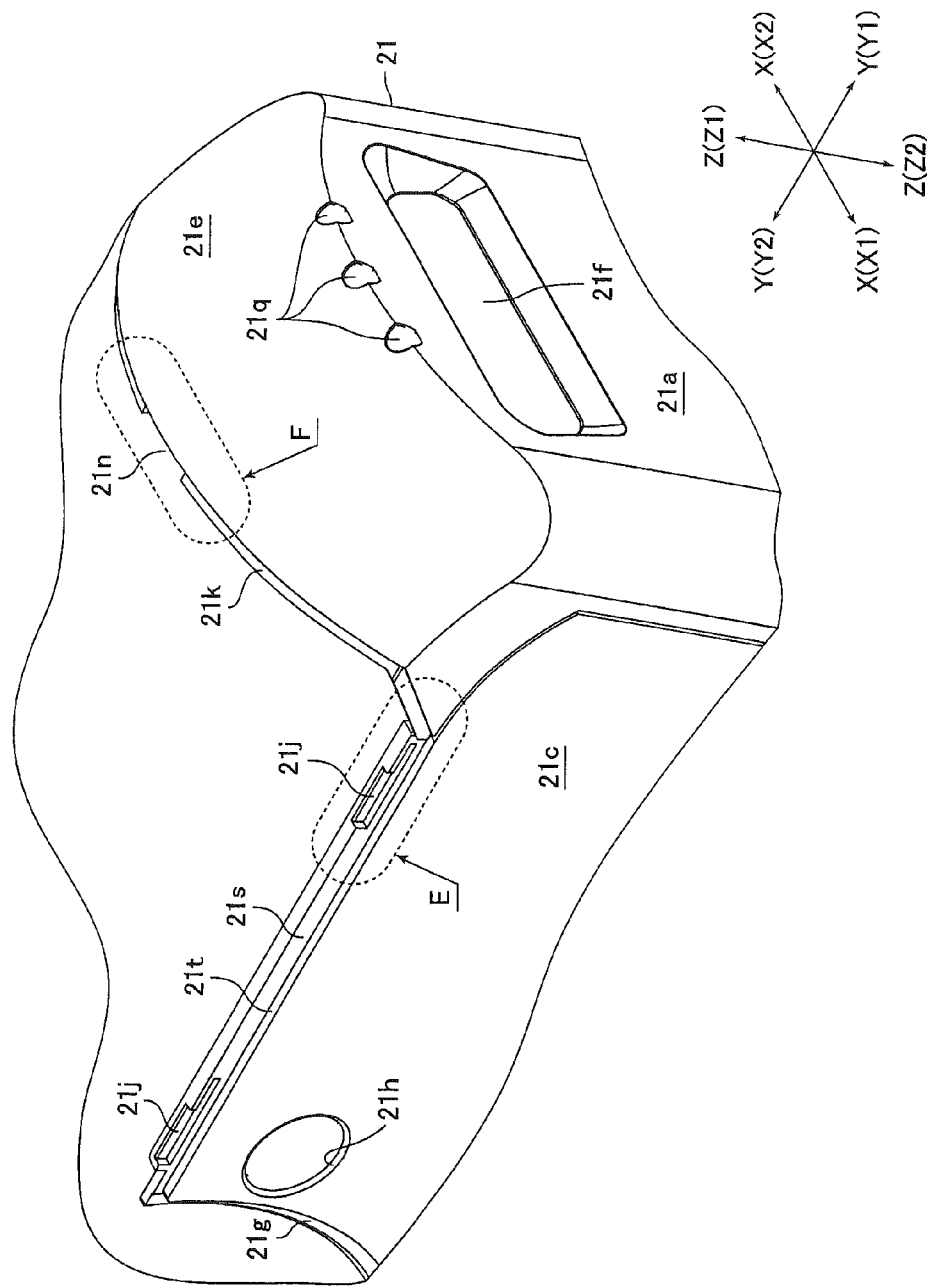
FIG. 6 is an enlarged perspective view showing a front end side of a first case body shown in FIG. 5.
Figure 7:
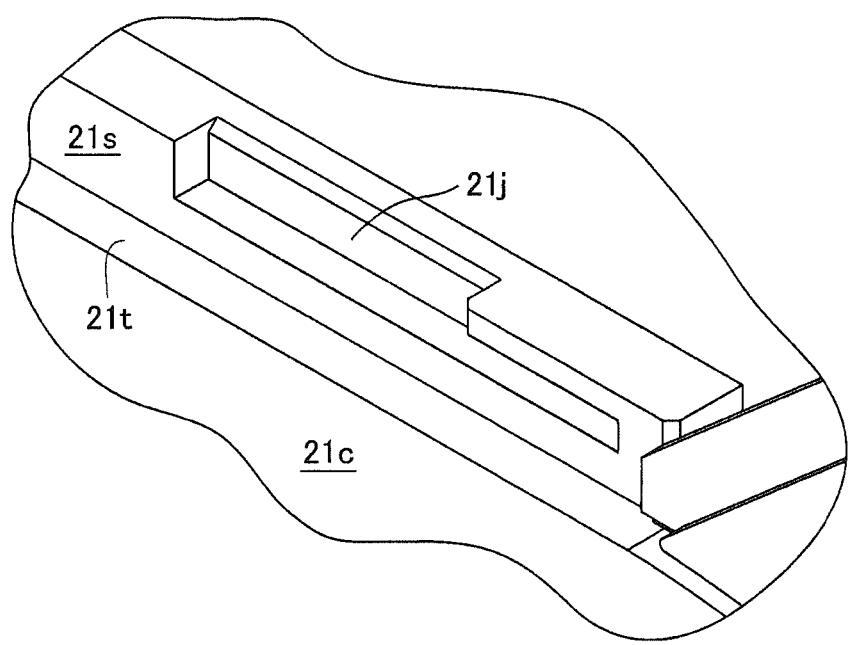
FIG. 7 is an enlarged view showing an "E" part in FIG. 6.
Figure 8:
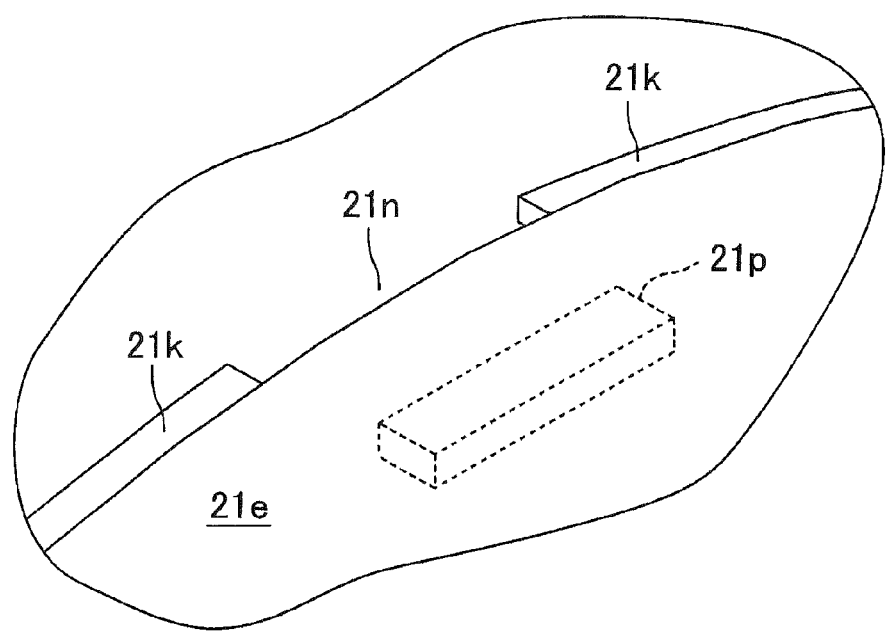
FIG. 8 is an enlarged view showing an "F" part in FIG. 6.
Figure 9A:
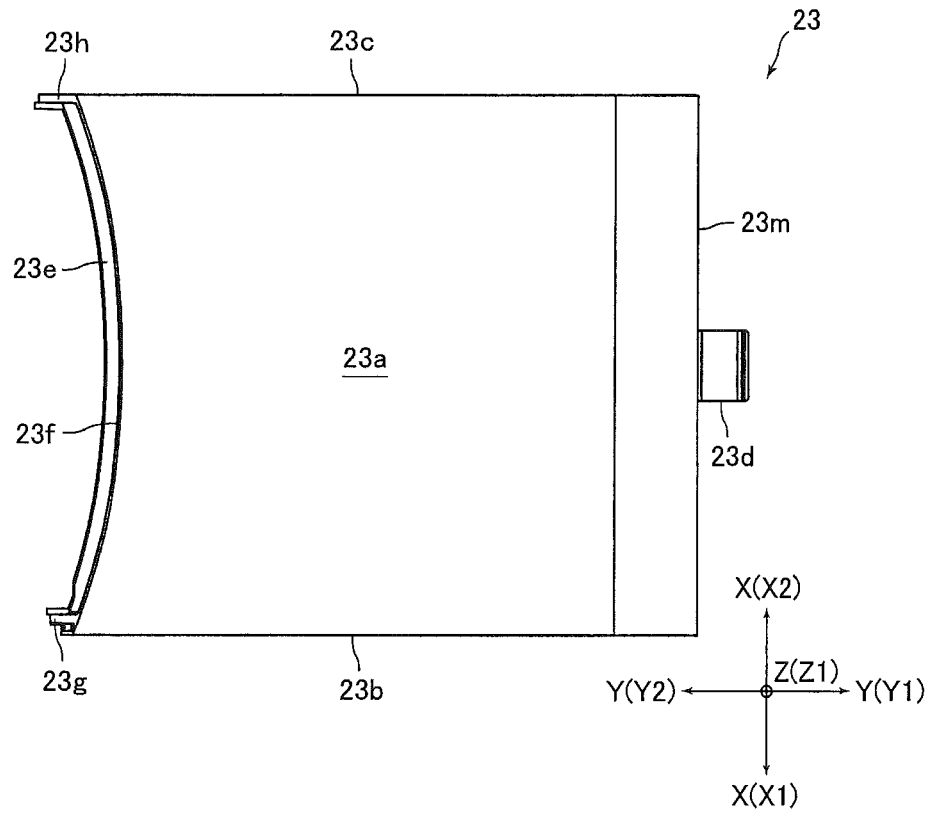
FIGS. 9(A) through 9(D) are views showing a third case body shown in FIG. 5.
Figure 9B:
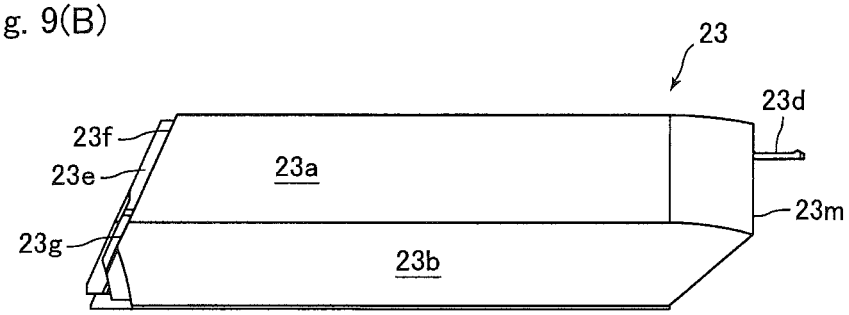
Figure 9C:
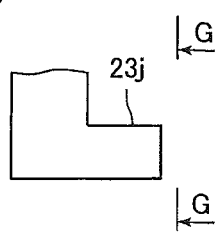
Figure 9D:
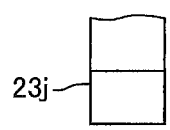
Figure 10:
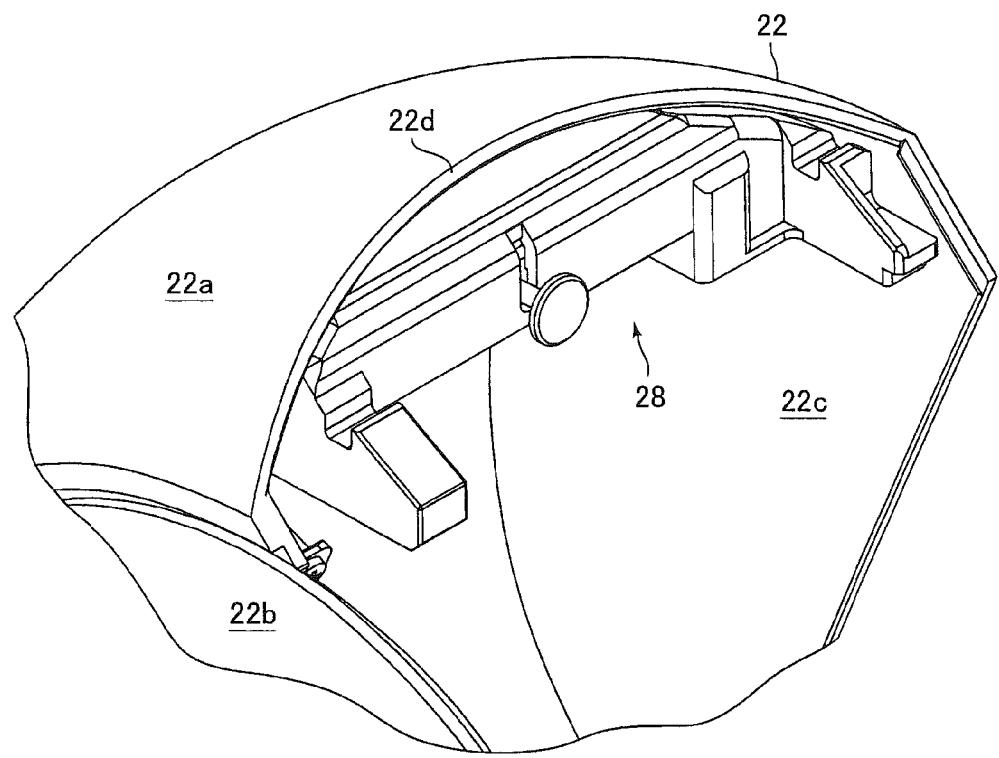
FIG. 10 is an enlarged perspective view showing a part of a second case body shown in FIG. 5.
Figure 10:
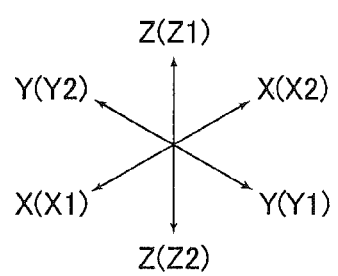
Figure 11A:
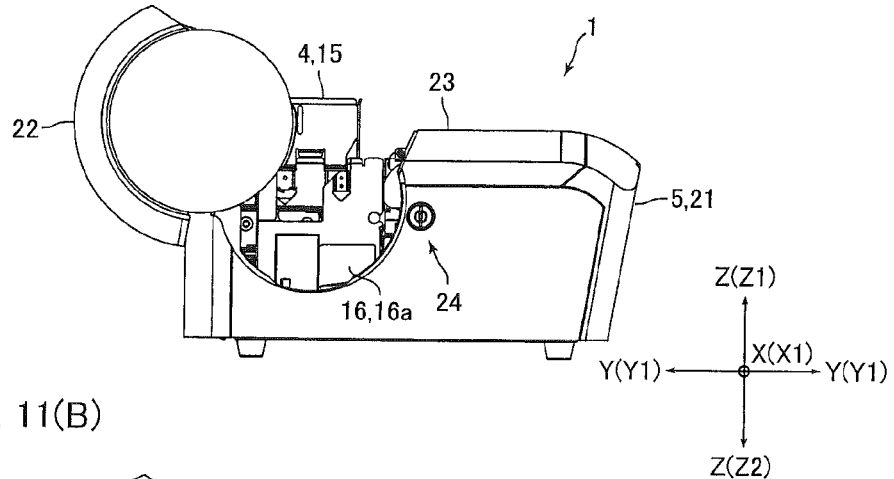
FIGS. 11(A) through 11(C) are explanatory views showing a movement of the third case body when the third case body is detached from the first case body shown in FIG. 5.
Figure 11B:
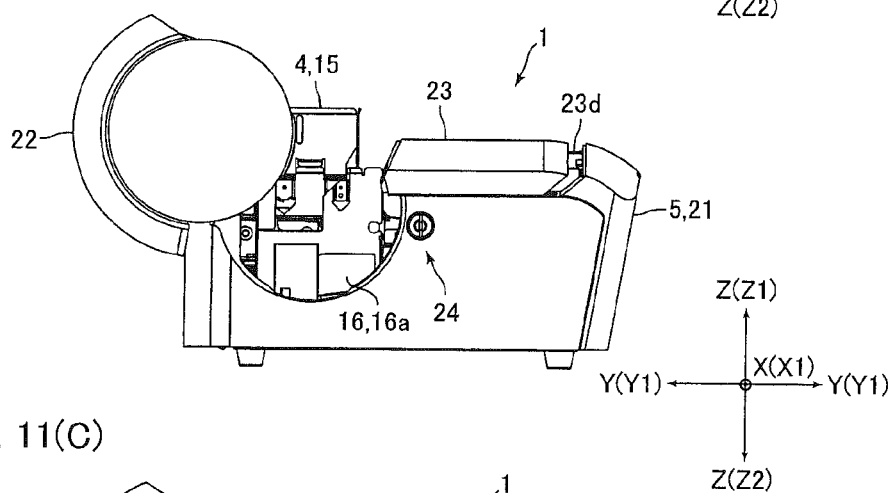
Figure 11C:
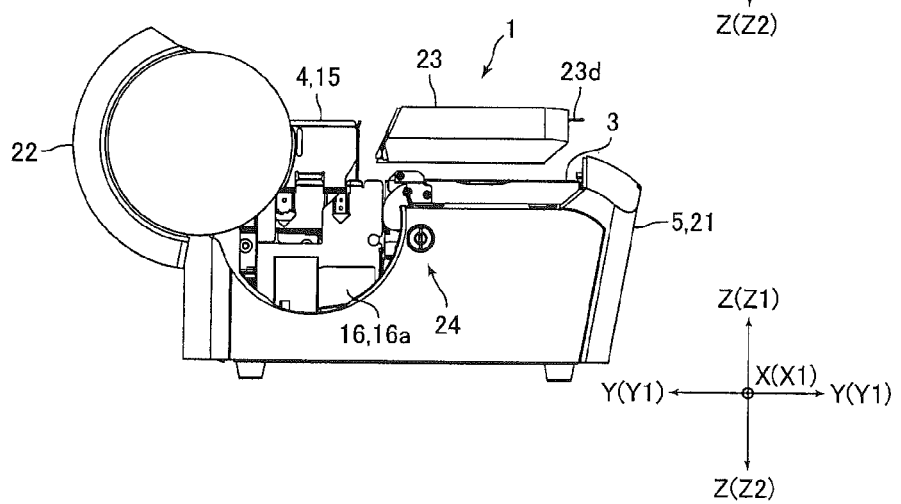

FIG. 5 is a side view showing a state where the housing 5 shown in FIG. 1 is opened. FIG. 6 is an enlarged perspective view showing a front end side of a first case body 21 shown in FIG. 5. FIG. 7 is an enlarged view showing an "E" part in FIG. 6. FIG. 8 is an enlarged view showing an "F" part in FIG. 6. FIGS. 9(A) through 9(D) are views showing a third case body 23 shown in FIG. 5. FIG. 9(A) is its plan view, FIG. 9(B) is its side view, FIG. 9(C) is a side view showing a slide protruded part 23j which is formed on the third case body 23, and FIG. 9(D) is a view showing the slide protruded part 23j which is viewed in the "G-G" direction in FIG. 9(C). FIG. 10 is an enlarged perspective view showing a part of a second case body 22 shown in FIG. 5. FIGS. 11(A) through 11(C) are explanatory views showing a movement of the third case body 23 when the third case body 23 is detached from the first case body 21 shown in FIG. 5.

The housing 5 is formed of resin and, as shown in FIG. 5, provided with a first case body 21 which structures parts of both right and left side faces of the card issuing machine 1 and its front face and its rear face, a second case body 22 for covering an upper side of the card storage part 15, and a third case body 23 for covering an upper side of the card reader part 3. As described above, the upper end side of the card storage part 15 is protruded upper than the upper face of the card reader part 3. Therefore, as shown in FIG. 1, the upper end side of the second case body 22 is protruded upper than the upper face of the third case body 23.

In this embodiment, the second case body 22 is attached to the first case body 21 so as to be capable of being opened and closed with a hinge (not shown) disposed on the rear face side of the card issuing machine 1. On the other hand, the third case body 23 is detachable to the first case body 21. Further, the housing 5 in this embodiment is capable of being locked by a lock mechanism 24 (see FIG. 2) so that the housing 5 in the closed state is not opened.

The first case body 21 is provided with a front face part 21a structuring a front face of the card issuing machine 1, a rear face part 21b structuring a rear face of the card issuing machine 1, a right side face part 21c structuring a lower side of a right side face of the card issuing machine 1, and a left side face part 21d structuring a lower side of a left side face of the card issuing machine 1. The first case body 21 is fixed to the card reader part 3, the card issuing and collecting part 4 and the like. Further, the first case body 21 is provided with an upper face cover part 21e which covers an upper side of a front end side of the card reader part 3 (specifically, the insertion and ejection part 14). Further, the front face part 21a is formed with a card ejection port 21f from which a card 2 is ejected.

A rear end side of the right side face part 21c is formed with a cutout part 21g which is recessed from an upper end of the right side face part 21c in a substantially semicircular arc shape. The cutout part 21g is formed on the right side with respect to the take-out opening 16a so that cards 2 collected into the card collection storage 16 are capable of being taken out from the take-out opening 16a toward the right direction. Further, the right side face part 21c is formed with an arrangement hole 21h where a cylinder 29 structuring a lock mechanism 24 described later is disposed.

An upper end of the right side face part 21c is formed with an abutting face 21s as a first abutting face which is capable of abutting with the third case body 23 from the inside (in other words, from the left side) in the right and left direction and an abutting face 21t as the first abutting face which is capable of abutting with the third case body 23 from the lower side. Specifically, an upper end of the right side face part 21c is formed in a stepped part which is lowered by one stage in the left direction, and a face directing to the right direction of the stepped part is the abutting face 21s and a face directing to the upper direction is the abutting face 21t.

Further, an upper end on the front end side of the right side face part 21c is formed with two slide grooves 21j for sliding the third case body 23 toward the front side in a state that two slide grooves 21j are separated from each other with a predetermined distance between them in the front and rear direction. Specifically, the slide groove 21j is formed so as to be recessed from the abutting face 21s at two positions, i.e., in the vicinity of an edge part on the front end side of the cutout part 21g and in the vicinity of a boundary portion between the right side face part 21c and the upper face cover part 21e. As shown in FIG. 7, an upper end on the rear end side of the slide groove 21j is formed with an opening and thus the slide protruded part 23j formed on the third case body 23 is attached to the slide groove 21j and detached from the slide groove 21j by utilizing the opening.

Similarly, an upper end of the left side face part 21d is also formed with an abutting face (not shown) as the first abutting face which is capable of abutting with the third case body 23 from the inside (in other words, from the right side) in the right and left direction and an abutting face (not shown) as the first abutting face which is capable of abutting with the third case body 23 from the lower side. Further, an upper end on the front end side of the left side face part 21d is formed with two slide grooves (not shown) for sliding the third case body 23 toward the front side in a state that two slide grooves are separated from each other with a predetermined distance between them in the front and rear direction. In this embodiment, as shown in FIG. 5, a cutout part corresponding to the cutout part 21g is not formed in the left side face part 21d.

The upper face cover part 21e is formed in a curved face shape which is bulged toward the upper side. Further, the upper face cover part 21e is formed to be connected with the upper end of the front face part 21a and the upper ends on the front end sides of the right side face part 21c and the left side face part 21d. A rear end of the upper face cover part 21e is, as shown in FIG. 5, formed with an abutting face 21k as a second abutting face which is capable of abutting with the third case body 23 from a lower side, and an abutting face 21m as a third abutting face which is capable of abutting with the third case body 23 from a front side. Specifically, the rear end of the upper face cover part 21e is formed in a stepped part which is lowered by one stage, and a face directing upward of the stepped part is the abutting face 21k and a face directing to the rear side is the abutting face 21m.

A top portion of the abutting face 21k is formed with a cutout part 21n. Further, as shown in FIG. 8, an under face of the upper face cover part 21e is formed with an engaging recessed part 21p, with which a tip end of an engaging projection 23d described later formed on the third case body 23 is engaged, so as to correspond to the forming position of the cutout part 21n.

A boundary portion between the front face part 21a and the upper face cover part 21e is, as shown in FIG. 6, formed with light emitting parts 21q. A light emitting means such as an LED (Light Emitting Diode) is disposed on an inner side of the light emitting part 21q.

The third case body 23 is, as shown in FIG. 9, provided with an upper face part 23a, which is formed in a curved surface so as to be bulged toward an upper side, a right side face part 23b which structures a part on the upper end side of the right side face of the card issuing machine 1, and a left side face part 23c which structures a part on the upper end side of the left side face of the card issuing machine 1. The third case body 23 is detachably mounted on the first case body 21.

A front end face 23m of the upper face part 23a is capable of abutting with the abutting face 21m of the first case body 21. Further, an under face on the front end side of the upper face part 23a is capable of abutting with the abutting face 21k of the first case body 21. A front end of the upper face part 23a is formed with an engaging projection 23d which is protruded toward the front side. The engaging projection 23d is formed at a position corresponding to the cutout part 21n of the first case body 21 and the tip end of the engaging projection 23d is engaged with the engaging recessed part 21p of the first case body 21. In other words, the engaging projection 23d is engaged with the under face of the upper face cover part 21e.

A rear end of the upper face part 23a is formed with an abutting face 23e as a fourth abutting face which is capable of abutting with the second case body 22 from a lower side and an abutting face 23f as a fifth abutting face which is capable of abutting with the second case body 22 from a front side. Specifically, the rear end of the upper face part 23a is formed in a stepped part which is lowered by one stage, and a face of the stepped part directing upward is the abutting face 23e and a face directing to the rear side is the abutting face 23f.

In this embodiment, the right side face part 23b is also formed with an abutting face 23g as the fourth abutting face which is capable of abutting with the second case body 22 from the front side (see FIGS. 9(A) and 9(B)). Specifically, the rear end of the right side face part 23b is formed in a stepped part which is lowered by one stage in the left direction, and a face of the stepped part directing to the rear direction is the abutting face 23g. Further, similarly, the left side face part 23c is also formed with an abutting face 23h as the fourth abutting face which is capable of abutting with the second case body 22 from the front side (see FIG. 9(A)).

A lower end side of an inner side face (in other words, the left side face) of the right side face part 23b in the right and left direction is capable of abutting with the abutting face 21s which is formed on the right side face part 21c of the first case body 21. Further, a lower end of the right side face part 23b is capable of abutting with an abutting face 21t which is formed on the right side face part 21c of the first case body 21. Similarly, a lower end side of an inner side face (in other words, right side face) of the left side face part 23c and a lower end of the left side face part 23c in the right and left direction are capable of abutting with abutting faces which are formed on the left side face part 21d of the first case body 21.

Further, lower end sides of inner side faces of the right side face part 23b and the left side face part 23c in the right and left direction are formed with slide protruded parts 23j which are engaged with slide grooves 21j of the first case body 21 (see FIGS. 9(C) and 9(D)). In this embodiment, two slide protruded parts 23j are formed on the right side face part 23b and the left side face part 23c so as to correspond to the slide grooves 21j formed at two positions in the state that two slide protruded parts 23j are separated from each other with a predetermined distance in the front and rear direction.

The second case body 22 is, as shown in FIGS. 5 and 10, provided with an upper face part 22a formed in a curved surface shape which is substantially similar to a part of spherical surface, a right side face part 22b structuring a part of the upper end side of the right side face of the card issuing machine 1, and a left side face part 22c structuring a part of the upper end side of the left side face of the card issuing machine 1. The second case body 22 is, as described above, capable of opening and closing the first case body 21 with a hinge which is disposed on the rear face side of the card issuing machine 1. The hinge is, for example, provided with a supporting point shaft which is fixed on the rear face side of the card issuing and collecting part 4 and the second case body 22 is turnably supported by the supporting point shaft.

One end face 22d (end face disposed on an upper side in FIG. 5) of the upper face part 22a is capable of abutting with the abutting faces 23f through 23h of the third case body 23. Further, an inner side face on one end side of the upper face part 22a is capable of abutting with the abutting face 23e of the third case body 23.

The right side face part 22b is, as shown in FIG. 5, formed in a substantially circular shape. Specifically, as shown in FIG. 1, the right side face part 22b is formed in a substantially circular shape so that a lower end side of the right side face part 22b is disposed over the entire region of the cutout part 21g which is formed in the right side face part 21c of the first case body 21 in the state that the second case body 22 is closed. In other words, the right side face part 22b is formed so as to cover the take-out opening 16a of the card collection storage 16 in the state where the second case body 22 is closed. The right side face part 22b in this embodiment is a side face cover part which structures a part of the side face of the card issuing machine 1 and which covers the take-out opening 16a.

A left side face part 22c is formed in a substantially semi-circular shape and, in the state where the second case body 22 is closed, a lower end of the left side face part 22c is abutted with the upper end on the rear end side of the left side face part 21d of the first case body 21.

The lock mechanism 24 is, as shown in FIG. 2, provided with a lock shaft 27 which is attached to an upper face on the rear end side of the card reader part 3, and a lock part 28 which is to be engaged with the lock shaft 27, and a cylinder 29 into which a key not shown is inserted. The lock part 28 is, as shown in FIG. 10, is attached to one end side of the second case body 22. Further, the cylinder 29 is attached to the right side face of the card reader part 3 and a part of the cylinder 29 is disposed in the arrangement hole 21h of the first case body 21.

In this embodiment, a state that the lock shaft 27 and the lock part 28 are engaged with each other is a closed state of the housing 5. Further, a state that the housing 5 has been closed and the key has been detached from the cylinder 29 is, as shown in FIG. 1, a locked state in which the housing 5 in the closed state is locked so as not to open.

In this locked state, when the key is inserted into the cylinder 29, the housing 5 is capable of being opened. In other words, when the key is inserted into the cylinder 29 to be turned in one direction, engagement of the lock shaft 27 with the lock part 28 are released and thus the second case body 22 is capable of being turned around the hinge. Further, in a state that engagement of the lock shaft 27 with the lock part 28 has been released, when the second case body 22 is turned around the hinge to make the lock shaft 27 engage with the lock part 28, the housing 5 is closed as described above. In this state, when the key is turned to the opposite direction and then the key is pulled out from the cylinder 29, the housing 5 is set in a locked state.

As described above, the lock mechanism 24 locks the second case body 22 so that the second case body 22 is not turned around the hinge. In other words, the lock mechanism 24 locks the second case body 22 so that the second case body 22 is not opened with respect to the first case body 21.

As described above, the front end face 23m of the third case body 23 is capable of abutting with the abutting face 21m of the first case body 21, and the under face on the front end side of the upper face part 23a of the third case body 23 is capable of abutting with the abutting face 21k of the first case body 21. Further, the inner side face of the right side face part 23b and the inner side face of the left side face part 23c in the right and left direction are capable of abutting with the abutting faces 21s and the like of the first case body 21, and the lower end of the right side face part 23b and the lower end of the left side face part 23c are capable of abutting with the abutting faces 21t and the like of the first case body 21. In addition, the engaging projection 23d of the third case body 23 is engaged with the under face of the upper face cover part 21e of the first case body 21. Further, the slide protruded parts 23j of the third case body 23 are engaged with the slide grooves 21j of the first case body 21. In other words, in this embodiment, the third case body 23 is engaged with the first case body 21 so that the third case body 23 is not detached from the first case body 21 toward the right and left sides, the upper and lower sides and toward the front side.

Further, when the housing 5 is in a closed state, the end face 22d of the second case body 22 is capable of abutting with the abutting faces 23f through 23h of the third case body 23, and the inner side face on one end side of the upper face part 22a of the second case body 22 is capable of abutting with the abutting face 23e of the third case body 23. In other words, in this embodiment, when the housing 5 is in a closed state, the third case body 23 is engaged with the second case body 22 so that the third case body 23 is not detached from the first case body 21 toward the rear side.

As described above, in this embodiment, when the housing 5 is in a closed state, the third case body 23 is engaged with the first case body 21 so that the third case body 23 is not detached from the first case body 21 toward the right and left sides, the upper and lower sides, and toward the front side, and the third case body 23 is engaged with the second case body 22 so that the third case body 23 is not detached from the first case body 21 toward the rear side. Therefore, when the housing 5 is in the closed state, the third case body 23 is unable to be detached from the first case body 21. Accordingly, in this embodiment, when the third case body 23 is to be detached from the first case body 21, the locked state of the housing 5 by the lock mechanism 24 is released and then the third case body 23 is detached.

Specifically, first, a key is inserted into the cylinder 29 and turned to one direction to release the locked state by the lock mechanism 24 of the housing 5 and then, as shown in FIG. 11(A), the second case body 22 is turned around the hinge toward the rear side. After that, as shown in FIG. 11(B), the third case body 23 is slid to the rear side. Specifically, the third case body 23 is slid to the rear side until the rear end of the slide protruded part 23*j* is abutted with the rear end of the slide groove 21*j*. In this state, the engaging projection 23*d* of the third case body 23 is detached from the under face of the upper face cover part 21*e*.

After that, as shown in FIG. 11(C), the third case body 23 is moved to the upper side and the third case body 23 is detached from the first case body 21. In this case, the slide protruded part 23*j* is passed through an opening which is formed in the upper end on the rear end side of the slide groove 21*j*.

When the third case body 23 is to be attached to the first case body 21, the third case body 23 is moved downward so that the slide protruded part 23*j* is passed through the opening of the upper end of the slide groove 21*j* and, after that, the third case body 23 is moved to the front side until the engaging projection 23*d* is engaged with the under face of the upper face cover part 21*e*.

Principal Effects in this Embodiment

As described above, in this embodiment, when the housing 5 is in a closed state, the third case body 23 is engaged with the first case body 21 so that the third case body 23 is not detached from the first case body 21 toward the right and left sides, the upper and lower sides, and toward the front side, and the third case body 23 is engaged with the second case body 22 so that the third case body 23 is not detached from the first case body 21 toward the rear side. Further, the lock mechanism 24 locks the second case body 22 so that the second case body 22 is not opened with respect to the first case body 21. Therefore, the third case body 23 is not detached from the first case body 21 unless the lock mechanism 24 is released and the second case body 22 is lifted to the upper side. In other words, even when a separate lock mechanism is not provided for locking the third case body 23 so that the third case body 23 is not detached from the first case body 21, the third case body 23 is not detached from the first case body 21 unless the second case body 22 is not lifted. Therefore, in this embodiment, a separate lock mechanism for locking the third case body 23 is not required and thus the structure of the card issuing machine 1 can be simplified.

Further, the card storage part 15 is required to replenish with cards 2 and the like and thus open-and-close frequency of the second case body 22 is higher. However, as long as malfunction such as card jamming is not occurred in the card reader part 3, the third case body 23 is not required to be detached from the first case body 21 and thus detaching frequency of the third case body 23 is lower. In this embodiment, when the lock mechanism 24 is released, only the second case body 22 whose open-and-close frequency is higher can be opened and closed in the state where the third case body 23 is attached to the first case body 21. Therefore, in this embodiment, open-and-close operation of the housing 5 is easy.

In this embodiment, the first case body 21 is formed with the slide groove 21*j* for sliding the third case body 23 toward the front side and the third case body 23 is formed with the slide protruded part 23*j* which is engaged with the slide groove 21*j*. Therefore, positioning of the third case body 23 to the first case body 21 is easy.

In this embodiment, a hinge for opening and closing the second case body 22 is disposed on the rear face side of the card issuing machine 1. Therefore, opening/closing operation of the second case body 22 is easily performed and thus its workability is improved. Further, handling of the second case body 22 is easy in comparison with a case that the second case body 22 is detached from the card issuing machine 1 whenever the second case body 22 is opened and closed. In addition, workings in the card storage part 15 such as replenishment of cards 2 or maintenance are capable of performing from the front side of the card issuing machine 1. Since a user inserts a card 2 from the front side of the card issuing machine 1, a predetermined space is always set on the front side of the card issuing machine 1. Therefore, when the card issuing machine 1 is structured so that workings in the card storage part 15 are performed from the front side of the card issuing machine 1, workings in the card storage part 15 are easily performed.

In this embodiment, the take-out opening 16*a* which is formed in the side face of the card collection storage 16 is covered by the right side face part 22*b* of the second case body 22. Therefore, even when an open-and-close part for the card collection storage 16 is not provided separately in the housing 5, cards 2 collected in the card collection storage 16 are taken out by making the second case body 22 open. Accordingly, the housing 5 is not required to provide with an open-and-close part for the card collection storage 16 and thus the structure of the housing 5 can be simplified.

In this embodiment, the power supply 6 and the control board 7 are disposed under the card reader part 3. Therefore, the power supply 6 and the control board 7 are disposed by utilizing a dead space which is formed under the card reader part 3 on the front side of the card collection storage 16. Accordingly, the size of the card issuing machine 1 can be reduced.

Other Embodiments

Although the present invention has been shown and described with reference to a specific embodiment, various changes and modifications will be apparent to those skilled in the art from the teachings herein.

In the embodiment described above, the slide groove 21*j* is formed in the first case body 21 and the slide protruded part 23*j* is formed on the third case body 23. However, the present invention is not limited to this embodiment. For example, it may be structured that a slide protruded part corresponding to the slide protruded part 23*j* is formed on the first case body 21 and a slide groove corresponding to the slide groove 21*j* is formed in the third case body 23. Alternatively, no slide groove 21*j* and no slide protruded part 23*j* may be formed.

In the embodiment described above, the hinge for opening and closing the second case body 22 is disposed on the rear face side of the card issuing machine 1. However, the present invention is not limited to this embodiment. For example, a hinge for opening and closing the second case body 22 may be disposed on the front end side of the second case body 22. Further, similarly to the third case body 23, the second case body 22 may be detached. In other words, the second case body 22 may be structured so as to be lifted toward the upper side and detached without being supported by the hinge.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card issuing machine for issuing a card which is stored in an inside of the card issuing machine, comprising:
  a card storage part in which the card is stacked and stored before being issued;
  a card reader part structured to perform at least one of reproduction of information recorded in the card and recording of information to the card;
  a housing in which the card storage part and the card reader part are accommodated; and
  a lock mechanism for locking the housing in a closed state so that the housing does not open;
  wherein the card storage part and the card reader part are disposed so that the card carried out from the card storage part is passed from the card reader part toward a card ejection port from which the card is ejected;
  wherein the housing comprises:
    a first case body provided as at least a front face of the card issuing machine where the card ejection port is formed and a part of a side face of the card issuing machine;
    a second case body structured to cover an upper side of the card storage part; and
    a third case body structured to cover an upper side of the card reader part;
  wherein the third case body is engaged with the first case body so that the third case body is not detached from the first case body toward both side face sides of the card issuing machine, toward a front face side and toward both upper and lower sides of the card issuing machine, and the third case body is engaged with the second case body so that the third case body is not detached from the first case body toward a rear face side of the card issuing machine, and
  wherein the lock mechanism locks the second case body so that the second case body does not open with respect to the first case body.

2. The card issuing machine according to claim 1, wherein
  the first case body is provided with an upper face cover part which covers a part on an upper side of the card reader part on the front face side of the card issuing machine,
  the first case body is formed with a first abutting face which is capable of abutting with the third case body from an inner side in a right and left direction that is perpendicular to a front and rear direction and an upper and lower direction of the card issuing machine,
  the upper face cover part is formed with a second abutting face, which is capable of abutting with the third case body from a lower side, and a third abutting face which is capable of abutting with the third case body from the front face side of the card issuing machine, and
  the third case body is formed with an engaging projection for engaging with an under face of the upper face cover part.

3. The card issuing machine according to claim 1, wherein the third case body is formed with a fourth abutting face, which is capable of abutting with the second case body from a lower side, and a fifth abutting face which is capable of abutting with the second case body from the front face side of the card issuing machine.

4. The card issuing machine according to claim 3, wherein
  one of the first case body and the third case body is formed with a slide groove for sliding the third case body toward the front face side of the card issuing machine, and
  the other of the first case body and the third case body is formed with a slide protruded part which is engaged with the slide groove.

5. The card issuing machine according to claim 3, further comprising a hinge for opening and closing of the second case body with respect to the first case body,
  wherein the hinge is disposed on the rear face side of the card issuing machine.

6. The card issuing machine according to claim 3, further comprising a card collection storage for collecting the card which is provided under the card storage part,
  wherein a side face of the card collection storage is formed with a take-out opening for the card that is collected, and the second case body is provided with a side face cover part which structures a part of the side face of the card issuing machine and covers the take-out opening.

7. The card issuing machine according to claim 1, further comprising:
  at least one of a power supply and a control board which are disposed under the card reader part.

8. The card issuing machine according to claim 1, wherein
  one of the first case body and the third case body is formed with a slide groove for sliding the third case body toward the front face side of the card issuing machine, and
  the other of the first case body and the third case body is formed with a slide protruded part which is engaged with the slide groove.

9. The card issuing machine according to claim 8, further comprising a hinge for opening and closing of the second case body with respect to the first case body,
  wherein the hinge is disposed on the rear face side of the card issuing machine.

10. The card issuing machine according to claim 9, further comprising a card collection storage for collecting a card which is provided under the card storage part,
  wherein a side face of the card collection storage is formed with a take-out opening for the card that is collected, and the second case body is provided with a side face cover part which structures a part of the side face of the card issuing machine and covers the take-out opening.

11. The card issuing machine according to claim 9, further comprising:
  a card collection storage for collecting a card which is provided under the card storage part, and
  at least one of a power supply and a control board which are disposed under the card reader part.

12. The card issuing machine according to claim 1, further comprising a hinge for opening and closing of the second case body with respect to the first case body,
  wherein the hinge is disposed on the rear face side of the card issuing machine.

13. The card issuing machine according to claim 12, wherein
  the first case body is provided with an upper face cover part which covers a part on an upper side of the card reader part on the front face side of the card issuing machine, the first case body is formed with a first abutting face which is capable of abutting with the third case body from an inner side in a right and left direction that is perpendicular to a front and rear direction and an upper and lower direction of the card issuing machine, the upper face cover part is formed with a second abutting face, which is capable of abutting with the third case body from a lower side, and a third abutting face which is capable of abutting with the third case body from the front face side of the card issuing machine, and the third case body is formed with an engaging projection for engaging with an under face of the upper face cover part.

14. The card issuing machine according to claim 13, wherein the third case body is formed with a fourth abutting face, which is capable of abutting with the second case body from a lower side, and a fifth abutting face which is capable of abutting with the second case body from the front face side of the card issuing machine.

15. The card issuing machine according to claim 1, further comprising a card collection storage for collecting a card which is provided under the card storage part, wherein a side face of the card collection storage is formed with a take-out opening for the card that is collected, and the second case body is provided with a side face cover part which structures a part of the side face of the card issuing machine and covers the take-out opening.

16. The card issuing machine according to claim 15, wherein the first case body is provided with an upper face cover part which covers a part on an upper side of the card reader part on the front face side of the card issuing machine, the first case body is formed with a first abutting face which is capable of abutting with the third case body from an inner side in a right and left direction that is perpendicular to a front and rear direction and an upper and lower direction of the card issuing machine, the upper face cover part is formed with a second abutting face, which is capable of abutting with the third case body from a lower side, and a third abutting face which is capable of abutting with the third case body from the front face side of the card issuing machine, and the third case body is formed with an engaging projection for engaging with an under face of the upper face cover part.

17. The card issuing machine according to claim 16, wherein the third case body is formed with a fourth abutting face, which is capable of abutting with the second case body from a lower side, and a fifth abutting face which is capable of abutting with the second case body from the front face side of the card issuing machine.

18. The card issuing machine according to claim 1, further comprising a card collection storage for collecting a card which is provided under the card storage part, and at least one of a power supply and a control board which are disposed under the card reader part.

* * * * *